(12) United States Patent
Singh

(10) Patent No.: US 11,553,454 B2
(45) Date of Patent: Jan. 10, 2023

(54) SYSTEM AND METHOD OF MULTIPLE APPLICATION FUNCTIONS INFLUENCE IN 5G NETWORKS

(71) Applicant: NEC Corporation, Tokyo (JP)

(72) Inventor: Shubhranshu Singh, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/268,834

(22) PCT Filed: Aug. 6, 2019

(86) PCT No.: PCT/EP2019/071150
§ 371 (c)(1),
(2) Date: Feb. 16, 2021

(87) PCT Pub. No.: WO2020/035357
PCT Pub. Date: Feb. 20, 2020

(65) Prior Publication Data
US 2021/0195554 A1      Jun. 24, 2021

(30) Foreign Application Priority Data

Aug. 16, 2018 (EP) .................................. 18189412

(51) Int. Cl.
| *H04W 68/00* | (2009.01) |
| *H04W 60/04* | (2009.01) |
| *H04W 4/60* | (2018.01) |
| *H04W 36/12* | (2009.01) |
| *H04W 68/12* | (2009.01) |

(52) U.S. Cl.
CPC ........... *H04W 68/005* (2013.01); *H04W 4/60* (2018.02); *H04W 36/12* (2013.01); *H04W 60/04* (2013.01); *H04W 68/12* (2013.01)

(58) Field of Classification Search
CPC ..... H04W 68/005; H04W 68/00; H04W 4/60; H04W 36/12; H04W 60/04; H04W 68/12
See application file for complete search history.

(56) References Cited

U.S. PATENT DOCUMENTS

| 2018/0192390 A1* | 7/2018 | Li ........................ H04W 8/065 |
| 2019/0261260 A1* | 8/2019 | Dao .................. H04W 36/0011 |
| 2020/0137182 A1* | 4/2020 | Zong .................. H04L 61/1552 |

OTHER PUBLICATIONS

Intel: "Solution for session continuity during UE mobility (Key Issue #3)", 3GPP Draft; S2-184814 23725_PCR_URLLC_Session_ Cont, 3rd Generation Partnership Project (3GPP), pp. 1-7, May 22, 2018 (Year: 2018).*
International Search Report for PCT Application No. PCT/EP2019/ 071150, dated Sep. 19, 2019.

(Continued)

*Primary Examiner* — Jinsong Hu
*Assistant Examiner* — Farideh Madani
(74) *Attorney, Agent, or Firm* — Sughrue Mion, PLLC

(57) ABSTRACT

A system is disclosed in which a data network is associated with an application function (AF). When there is a change of data network access identifier (DNAI), a Session Management Function (SMF) sends a notification of a user plane management event to the application function (AF), and when a target data network is associated with another application function (target AF), the SMF also sends a notification of a user plane management event to the target AF.

7 Claims, 8 Drawing Sheets

(56) References Cited

OTHER PUBLICATIONS

Written opinion for PCT Application No. PCT/EP2019/071150, dated Sep. 19, 2019.
Intel: "Solution for session continuity during UE mobility (Key Issue #3)", 3GPP Draft; S2-184814_23725_PCR_URLLC_Session_Cont, 3rd Generation Partnership Project (3GPP), pp. 1-7, May 22, 2018.
Nokia et al: "PCF added as consumer of EventExposure service of AMF and SMF", 3GPP Draft; S2-188156 Was S2-187584, Aug. 14, 2018.

* cited by examiner the present invention seeks to provide methods and associated apparatus that address or at least alleviate (at least some of) the above issues.

SYSTEM AND METHOD OF MULTIPLE APPLICATION FUNCTIONS INFLUENCE IN 5G NETWORKS

This application is a National Stage Entry of PCT/EP2019/071150 filed on Aug. 6, 2019, which claims priority from EP Patent Application 18189412.2 filed on Aug. 16, 2018, the contents of all of which are incorporated herein by reference, in their entirety.

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to Application Function influence on traffic routing in the so-called '5G' (or 'Next Generation') systems.

3GPP Release-15 Technical Specification (TS) 23.501 V15.2.0 and TS 23.502 V15.2.0 provide methods to allow Application Function (AF) influence on traffic routing. For example TS 23.501, Section 5.6.7 provides details on "Application Function influence on traffic routing". Similarly, 3GPP TS 23.502, section 4.3.6 provides details including Processing AF requests to influence traffic routing for Sessions not identified by an UE address, Notification of User Plane Management Events and Transferring an AF request targeting an individual UE address to the relevant PCF.

However, in these and other specifications, there is no solution and detail procedure to enable deployments and interactions among different control plane, user plane and data network especially for URLLC applications and ETSUN (i.e. Enhancing Topology of SMF and UPF in 5G Networks) deployments where two or more AFs are deployed e.g. in case of UE mobility and availability of Local Area Data Network (LADN) or edge networks. Such deployments are shown as an example in FIG. 5. The Interfaces and Network functions shown in FIG. 5 are similar to those in 3GPP TS 23.501 and 3GPP TS 23.502 except those functions and methods proposed here. However, FIG. 5 highlights a simplified and generalized network to keep relevance to the present description. The inventors have realised that in this type of systems one or more of the following problems are not yet addressed:
1. How SMF and PCF handle two (or more) separate AF requests, often combined with subscriptions to SMF events, that are received over N5 interface. Received AF request and subscriptions to SMF events may be for the same or different PDU session(s), e.g. from AF1 and AF2 as shown in FIG. 5.
2. The so-called "event" driven AF replies (i.e. when the SMF sends a notification to the AF based on certain events such as UPF selection and PSA change), imply that the SMF needs to determine or should be aware of which AF it should send the notification to. However, currently there is no method or procedure available to enable the SMF to figure out such detail.
3. When the AF request is for influencing SMF routing decisions, the so-called 'temporal validity condition' indicates when the traffic routing is to be applied. When the AF request is for subscription to notifications about UP path management events, the temporal validity condition indicates when the notifications are to be generated. However, this validity condition indicator may become invalid, for example when a new AF is used (in a new DN).
4. In case of multiple AF requests, currently there is no solution available to enable the SMF (and/or the PCF) to learn whether the received AF request is for the PDU session for which it received an earlier AF request (e.g. a request sent by AF1 in FIG. 5) or the received AF request is for another PDU session (corresponding to AF2).

Accordingly, the present invention seeks to provide methods and associated apparatus that address or at least alleviate (at least some of) the above issues.

In one aspect, the present invention provides a method performed by a Session Management Function (SMF) in a communication network in which a data network is associated with an application function (AF), the method comprising: when there is a change of data network access identifier (DNAI), sending a notification of a user plane management event to the AF, wherein when a target data network is associated with another, target AF, the method comprises also sending a notification of a user plane management event to the target AF.

In one aspect, the present invention provides a method performed by an Application Function (AF), in a communication network comprising a Session Management Function (SMF) and at least one further AF, the method comprising: receiving, from the SMF, when the AF is operating as a target AF associated with a target data network when a data network access identifier (DNAI) has changed, a notification of user plane management event.

In one aspect, the present invention provides a Session Management Function (SMF) in a communication network in which a data network is associated with an application function (AF), the SMF comprising: means for sending, when there is a change of data network access identifier (DNAI), a notification of a user plane management event to the AF, wherein when a target data network is associated with another, target AF, the controller is also configured to send a notification of a user plane management event to the target AF.

In one aspect, the present invention provides an Application Function (AF), in a communication network comprising a Session Management Function (SMF) and at least one further AF, the AF comprising: means for receiving, from the SMF, when the AF is operating as a target AF associated with a target data network when a data network access identifier (DNAI) has changed, a notification of user plane management event.

In one aspect, the present invention provides a Session Management Function (SMF) in a communication network in which a data network is associated with an application function (AF), the SMF comprising a controller and a transceiver, wherein the controller is configured to: send, when there is a change of data network access identifier (DNAI), a notification of a user plane management event to the AF, wherein when a target data network is associated with another, target AF, the controller is also configured to send a notification of a user plane management event to the target AF.

In one aspect, the present invention provides an Application Function (AF), in a communication network comprising a Session Management Function (SMF) and at least one further AF, the AF comprising a controller and a transceiver, wherein the controller is configured to: receive, from the SMF, when the AF is operating as a target AF associated with a target data network when a data network access identifier (DNAI) has changed, a notification of user plane management event.

Aspects of the invention extend to corresponding systems and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

Embodiments of the invention will now be described, by way of example, with reference to the accompanying drawings in which.

OVERVIEW

Figure 1:
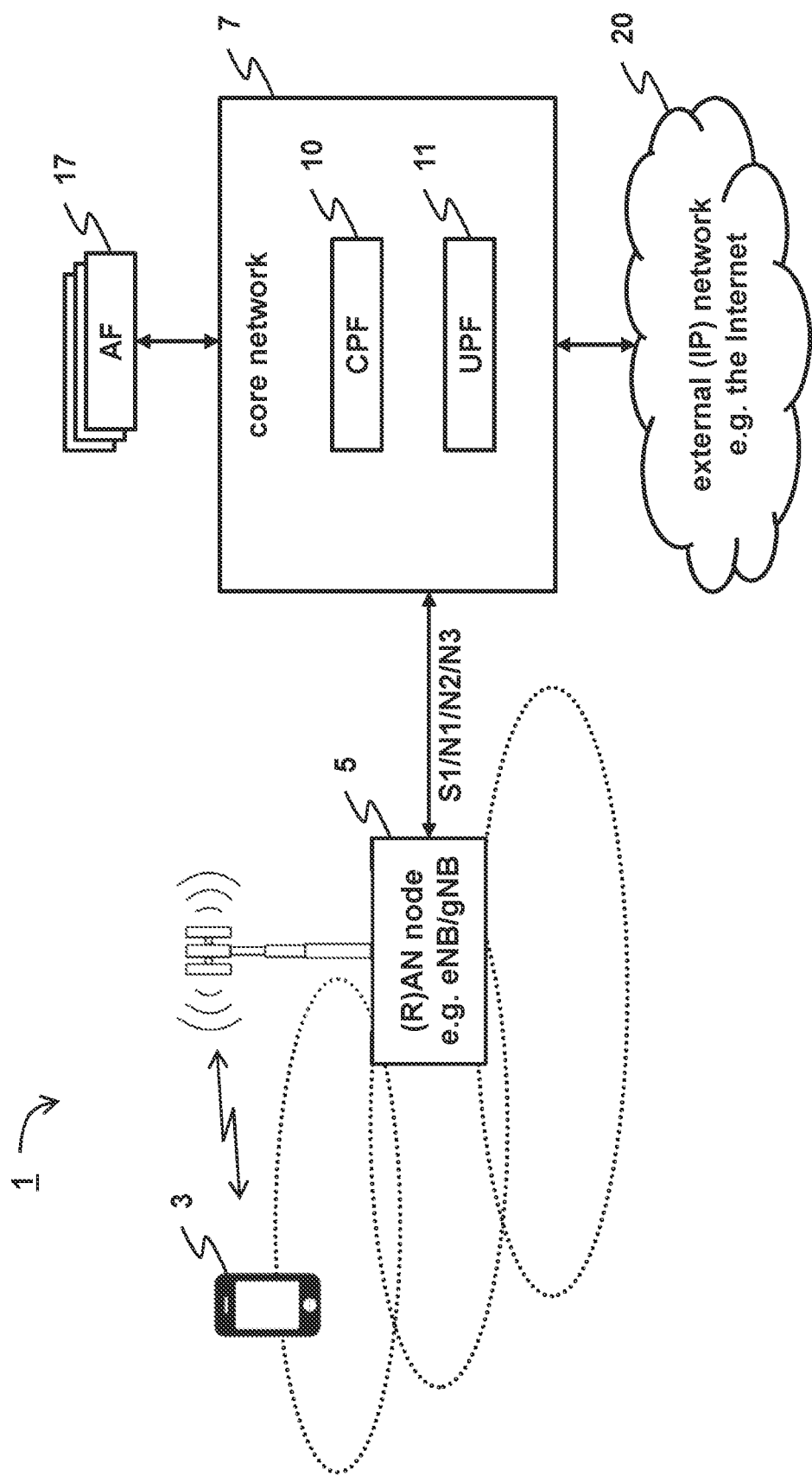
FIG. 1 illustrates schematically a generic mobile (cellular or wireless) telecommunication system to which embodiments of the invention may be applied.

FIG. 1 schematically illustrates a mobile (cellular or wireless) telecommunication system 1 to which the above embodiments are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 1 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports NextGeneration/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) 10 and user plane functions (UPFs) 11. It will be appreciated that the core network 7 may also include one or more of: the Access and Mobility Management Function (AMF) 12, the Session Management Function (SMF) 13, the Policy Control Function (PCF) 14, the Network Exposure Function (NEF) 15, and the Unified Data Repository (UDR) 16 shown in FIGS. 5 to 8.

In this example, the core network 7 is coupled to at least one application function (AF) 17 (e.g. via the Internet). From the core network 7, connection to an external IP network 20 (such as the Internet) is also provided.

The components of this system 1 are configured to perform one or more of the following functionalities:

determining (by the SMF) a change of DNN for an ongoing session, resulting in a change of the associated AF;

the SMF and/or NEF cancelling a registered event notification request towards the AF that originally requested it (e.g. a source-AF);

transmitting a message from the SMF and/or NEF and/or AF indicating at least one of an ongoing session ID, source-AF request ID, and/or the like; and the SMF updating a timer value based on (corresponding to) a Temporal validity condition from a new (target) AF and deleting the timer value corresponding to the Temporal validity condition received from a previous (source) AF.

User Equipment (UE)

Figure 2:
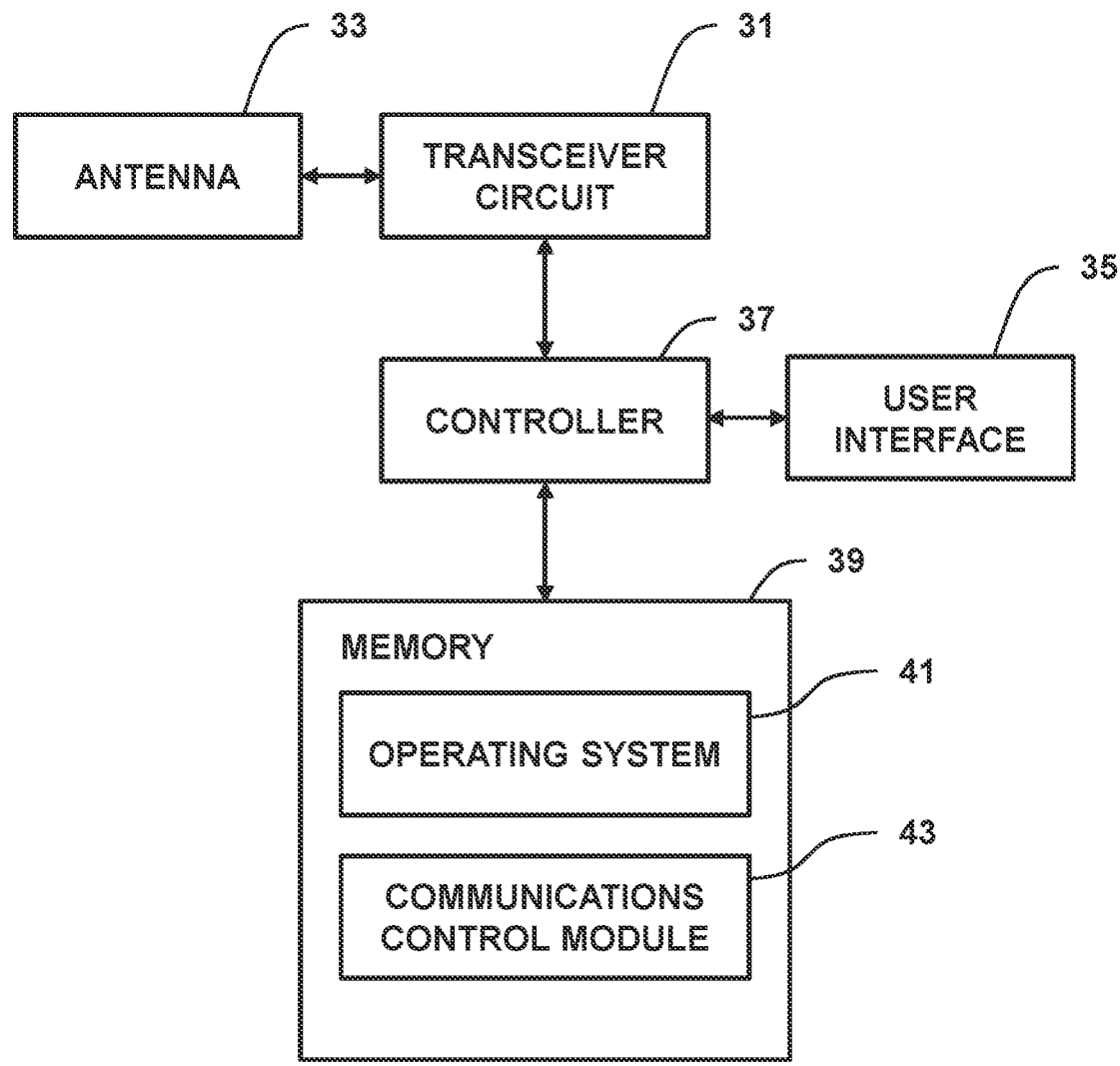
FIG. 2 is a schematic block diagram of an UE forming part of the system shown in FIG. 1.

FIG. 2 is a block diagram illustrating the main components of the UE (mobile device 3) shown in FIG. 1. As shown, the UE includes a transceiver circuit 31 which is operable to transmit signals to and to receive signals from the connected node(s) via one or more antenna 33. Although not necessarily shown in FIG. 2, the UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signalling messages and uplink/downlink data packets between the UE 3 and other nodes, including (R)AN nodes 5, core network nodes, and application functions.

(R)AN Node

Figure 3:
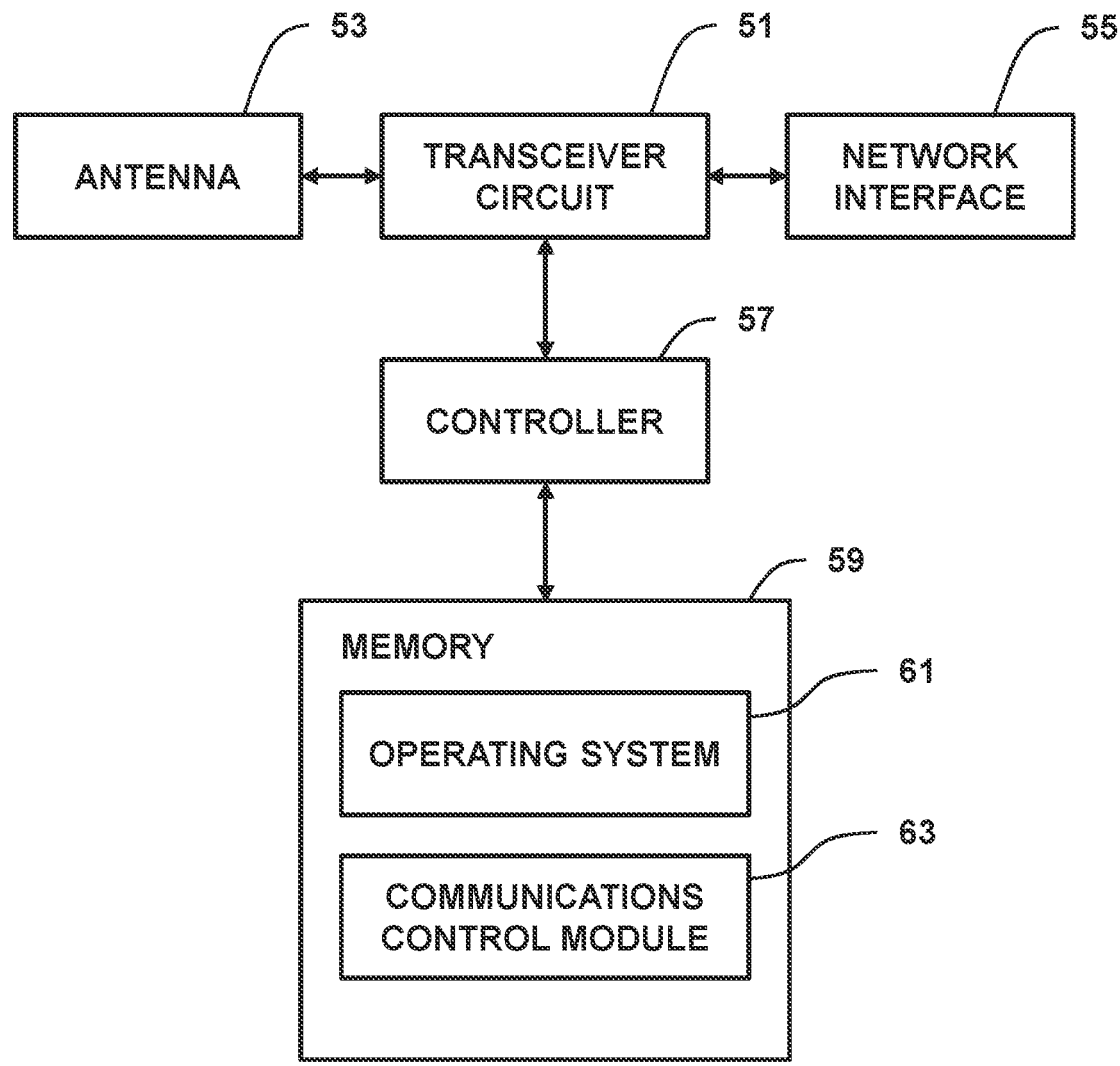
FIG. 3 is a schematic block diagram of a (R)AN node (base station) forming part of the system shown in FIG. 1.

FIG. 3 is a block diagram illustrating the main components of an exemplary (R)AN node 5 (base station) shown in FIG. 1. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signalling between the (R)AN node 5 and other nodes, such as the UE 3 and the core network nodes/AFs 17.

Core Network Node

Figure 4:
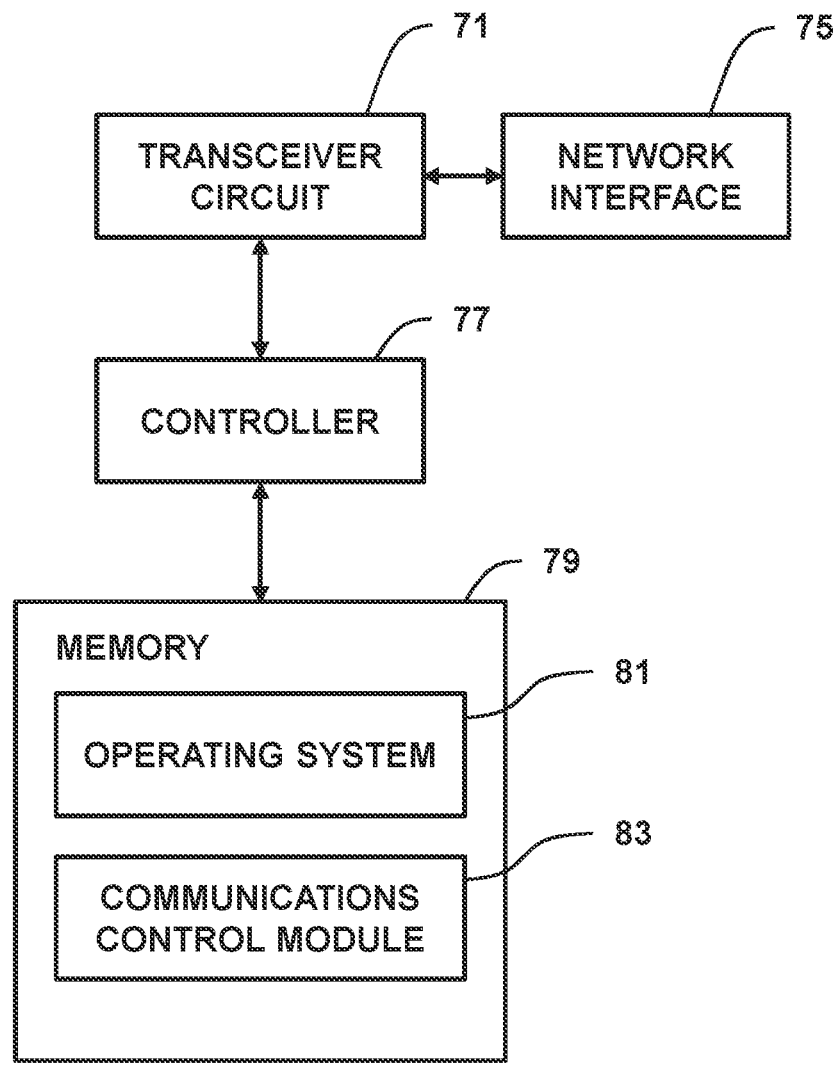
FIG. 4 is a schematic block diagram of a (core) network node forming part of the system shown in FIG. 1.

FIG. 4 is a block diagram illustrating the main components of a generic core network node (or function) shown in FIGS. 5 to 8. It will be appreciated that the same block diagram may be applicable to the AF 17 as well. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signaling between the core network node and other nodes, such as the UE 3, (R)AN node 5, the AFs 17, and other core network nodes. Such signaling includes appropriately formatted requests and responses relating to Application Function influence on traffic routing.

DETAILED DESCRIPTION

Embodiment 1

Figure 5:
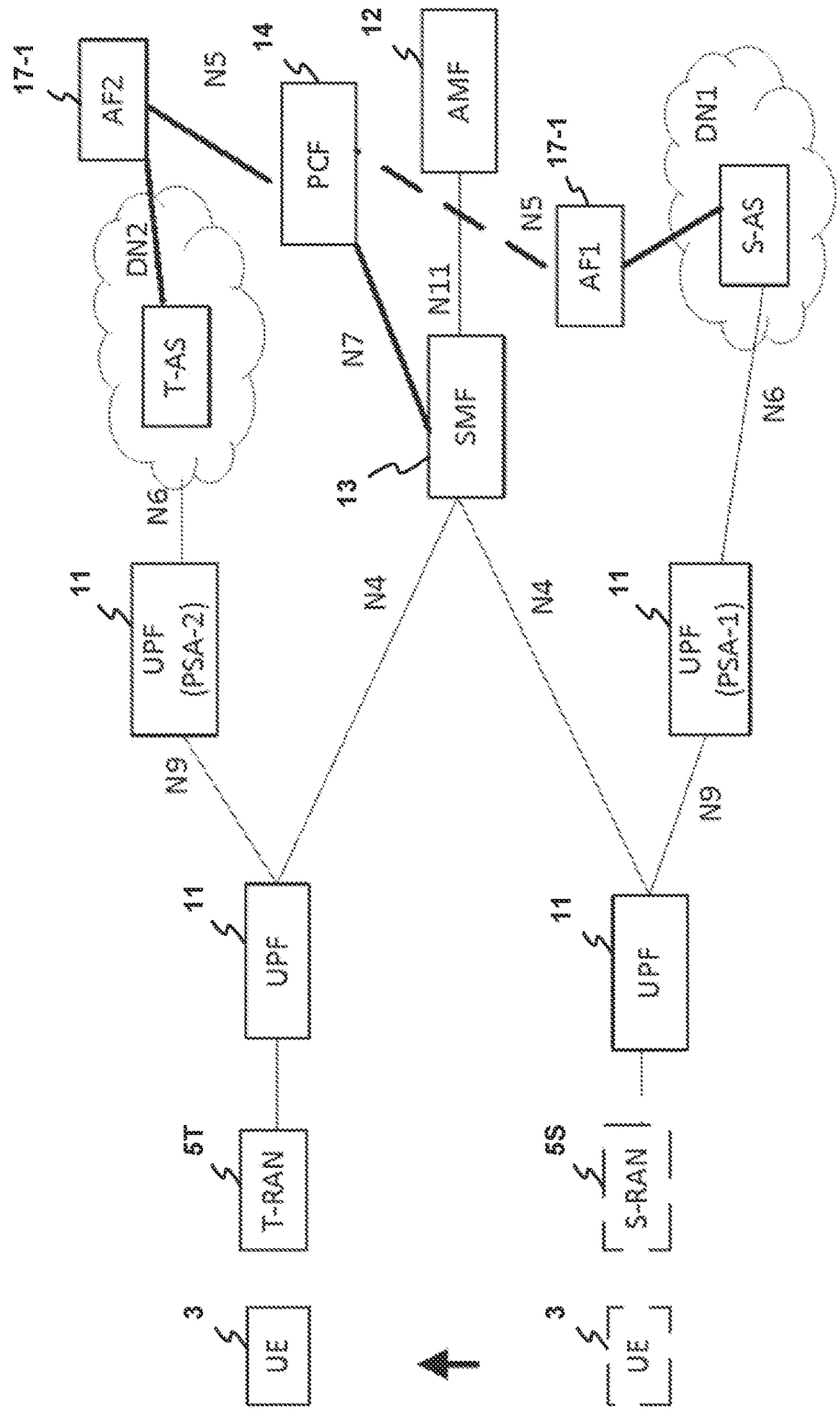
FIG. 5 illustrates schematically a simplified network architecture with multiple application functions and UE mobility to a Local Area Data Network.
Figure 6:
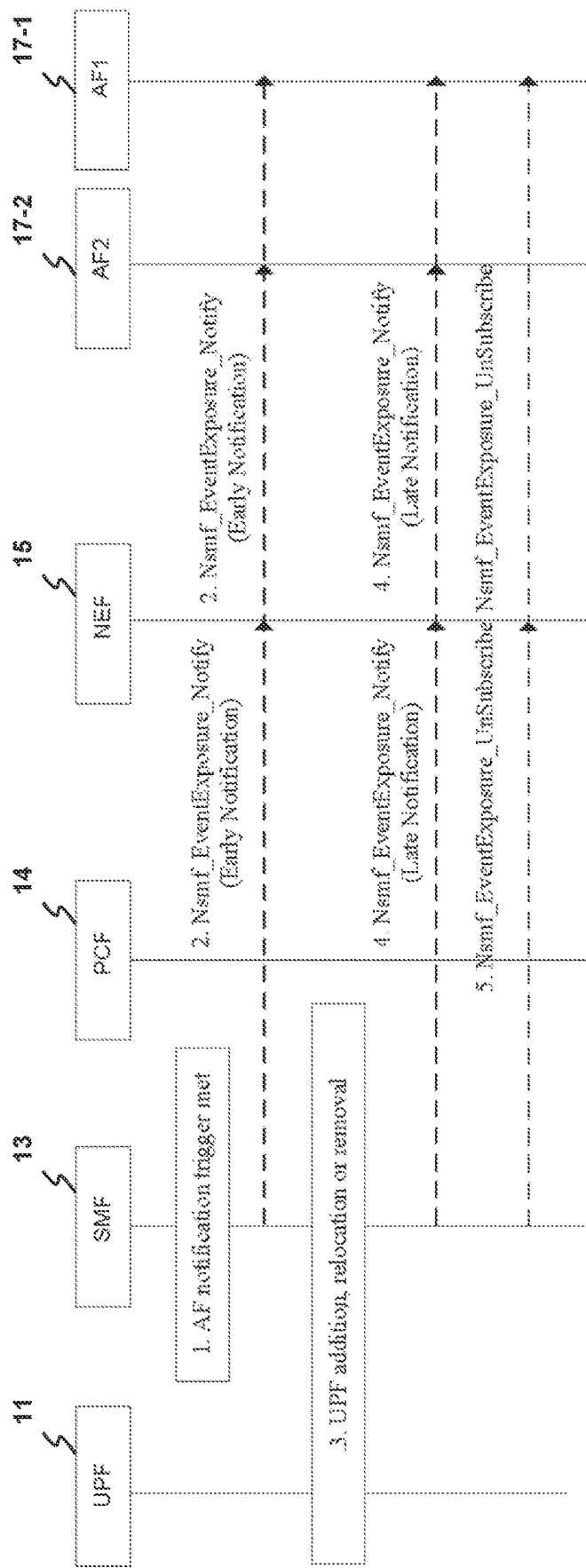
FIG. 6 is a schematic signaling (timing) diagram illustrating an exemplary method for notification of a user plane management event in the system shown in FIG. 1.

The embodiment describes a method and a system to address problems explained above specific to, but not restricted to 5G networks. In particular, the embodiment proposes a method and a system including at least some of the following functionalities:

1. The SMF 13 learns about a Data Network (DN) or a Data Network Name (DNN) change e.g. due to UE mobility, AF request to influence traffic policies, offloading to a LADN, configuration policies, and so on.
2. Certain change in DN may result in re-locating an associated Application Function 17, e.g. re-locating AF1 to AF2 as shown in FIG. 5.
3. The SMF 13 sends, to the AF2 17-2, notification of a user plane management event, e.g. as shown in FIG. 6. For example, the SMF 13 can send a Nsmf_EventExposure_Notify message. This message includes, among other information:
   i. AF request ID. This is the value corresponding to the AF request from AF1.
   ii. PDU session ID. This indicates ongoing PDU session corresponding to this notification.
4. The SMF 13 and AF1 17-1 may cancel the AF request initially corresponding to AF1. The SMF 13 and/or AF1 17-1 also sends cancellation message to AF1 and/or SMF, respectively.
   i. The SMF 13 on receipt of AF request from the AF1 17-1 maintains a "validity timer" as provided in "Temporal validity condition". This timer initially corresponding to AF1 is now on receipt of an AF request from the AF2 17-2 is set to value "0" i.e. the timer expires. This validity timer was originally set to indicate time interval(s) or duration(s) during which the AF request is to be applied.
   ii. The SMF 13 sets a new value indicating "validity timer" corresponding to the newly received AF request from AF2 17-2, indicated by "Temporal validity condition".
   iii. When the AF request is for influencing SMF routing decisions, the temporal validity condition indicates when the traffic routing is to apply. When the AF request is for subscription to notifications about UP path management events, the temporal validity condition indicates when the notifications are to be generated. These are updated (and replaced with) to indicated conditions received from the AF2 17-2.

Embodiment 2

Additionally, the method may also include the below exemplary procedure related to 25 Notification of user plane management event from the SMF 13 and/or PCF 14 to NEF and/or AFs 17. The procedure shown in FIG. 6 illustrates the following exemplary steps:
1. A condition for an AF notification has been met.
2. In case of early notification, the SMF 13 notifies the intended AF 17 (e.g. AF1 17-1 as well as AF2 17-2) by invoking Nsmf_EventExposure_Notify service operation. Additionally, the SMF 13 may also provide at least one of the following information to the AF2 17-2:
   a. AF request ID. This is the value corresponding to the AF request from the AF1 17-1.
   b. PDU session ID. This indicates ongoing PDU session corresponding to this notification.
3. The SMF 13 enforces the change of an associated Data Network Access Identifier (DNAI) or addition, change, or removal of a UPF.
4. In case of late notification, the SMF 13 notifies the AFs 17 (e.g. AF1 17-1 as well as AF2 17-2) by invoking Nsmf_EventExposure_Notify service operation. Additionally, it may also provide at least one of the following information to the AF2 17-2:
   a. AF request ID. This is the value corresponding to the AF request from the AF1 17-1.
   b. PDU session ID. This indicates ongoing PDU session corresponding to this notification.
5. The SMF 13 cancels or modifies AF notification, for example, by sending a Nsmf_EventExposure_Subscribe service operation message or by sending a Nsmf_EventExposure_UnSubscribe message to the AF1 17-1 either directly or via the NEF 15. This is to indicate cancellation of AF request to send user plane event notification message in response to the earlier received AF request from the AF1 17-1.

Embodiment 3a

Figure 7:
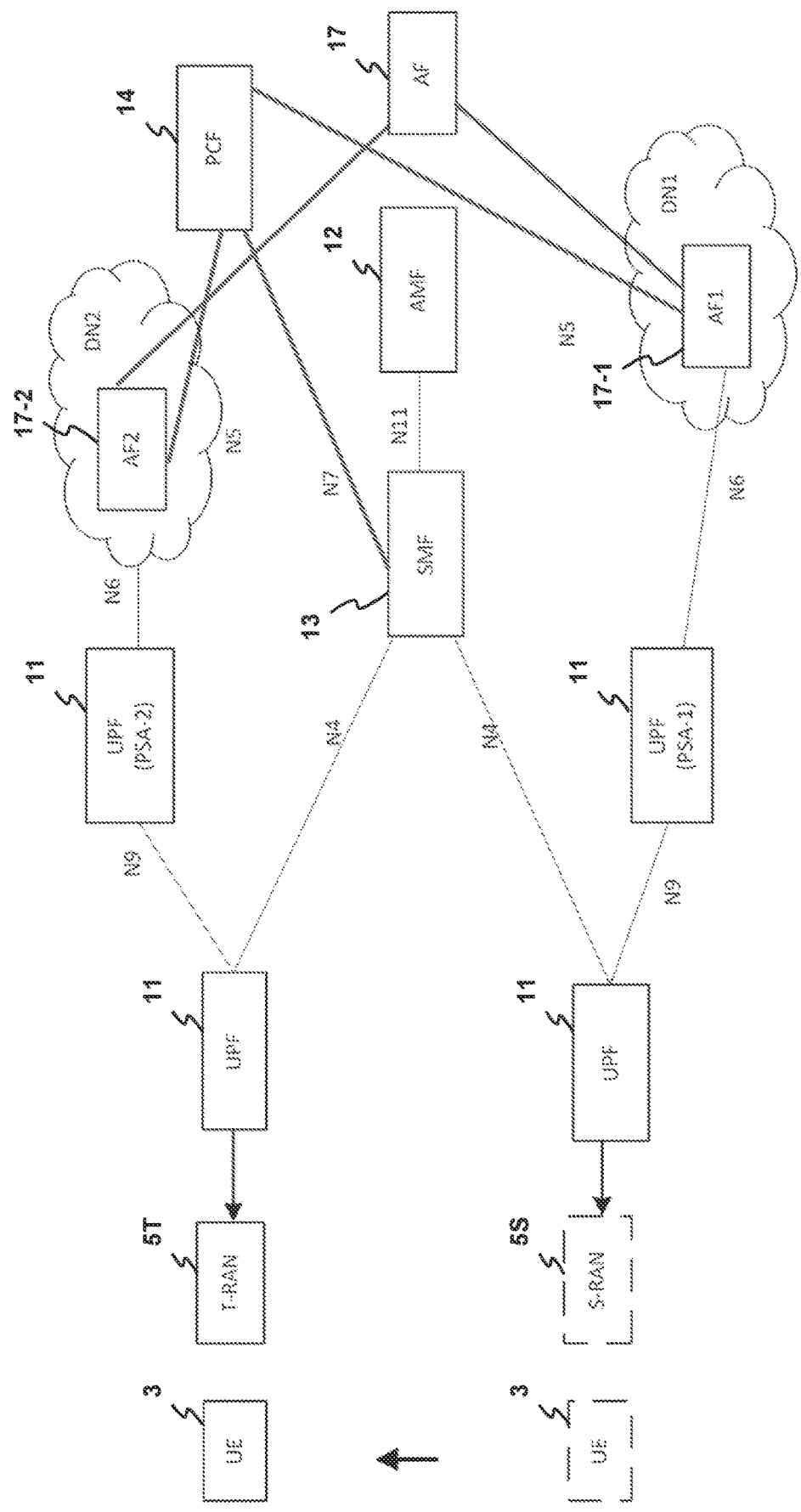
FIG. 7 illustrates schematically another simplified network architecture with multiple application functions and UE mobility to a Local Area Data Network.

Another embodiment to above mentioned problems is to enable some communication and harmonization among different data networks and/or AF to AF communication and/or pre-configuration of certain required information. This communication between AFs is an important aspect from end to end deployment perspective. Overall procedures are explained as below. As an example, a simplified and generalized network with multiple AFs, highlighting UE mobility to a Local Area Data Network or LADN is shown in FIG. 7.

The SMF 13 learns about a DN change e.g. due to UE mobility, AF request to influence traffic policies, offloading to a LADN, configuration policies and so on. Certain change in DN may result in re-locating an associated Application Function 17, e.g. re-locating AF1 to AF2 as shown in FIG. 7.

The SMF 5 13 sends an event notification to the AF1 17-1 (the AF1 17-1 is the source-AF or the AF currently associated with the current Data Network). The event notification includes, among other information, AF2 details corresponding to a new DNAI (the AF2 17-2 is the target-AF or the AF associated with a target/new Data Network).

There are message exchanges among two or more AFs 17.
In one of the messages, the AF1 17-1 informs the AF2 17-2 of the "AF request ID" and PDU session ID specific to the specific ongoing session with a particular UE 3.

The AF2 17-2, based on received information from the AF1 17-1, sends an AF request to the NEF 15/PCF 14. The message includes AF request ID, PDU session ID, etc. These and other received information helps SMF 13/PCF 14, for example, to determine that the received policies are applicable and could be replacement of earlier policies received from the AF1 17-1 for the same PDU session.

The AF2 17-2 also sets a new "temporal validity condition".

On receipt of a corresponding AF request from the AF2 17-2, the SMF 13 also updates the "temporal validity condition" and accordingly sends notifications about UP path management events.

The AF1 17-1 cancels or modifies the AF notification, for example, by sending an Nsmf_EventExposure_Subscribe service operation message or by sending an Nsmf_EventExposure_UnSubscribe message to the PCF 14/NEF 15.

On receipt of this message, the SMF 13 stops sending UP management event notification to the AF1 17-1.

Embodiment 3b

Figure 8:
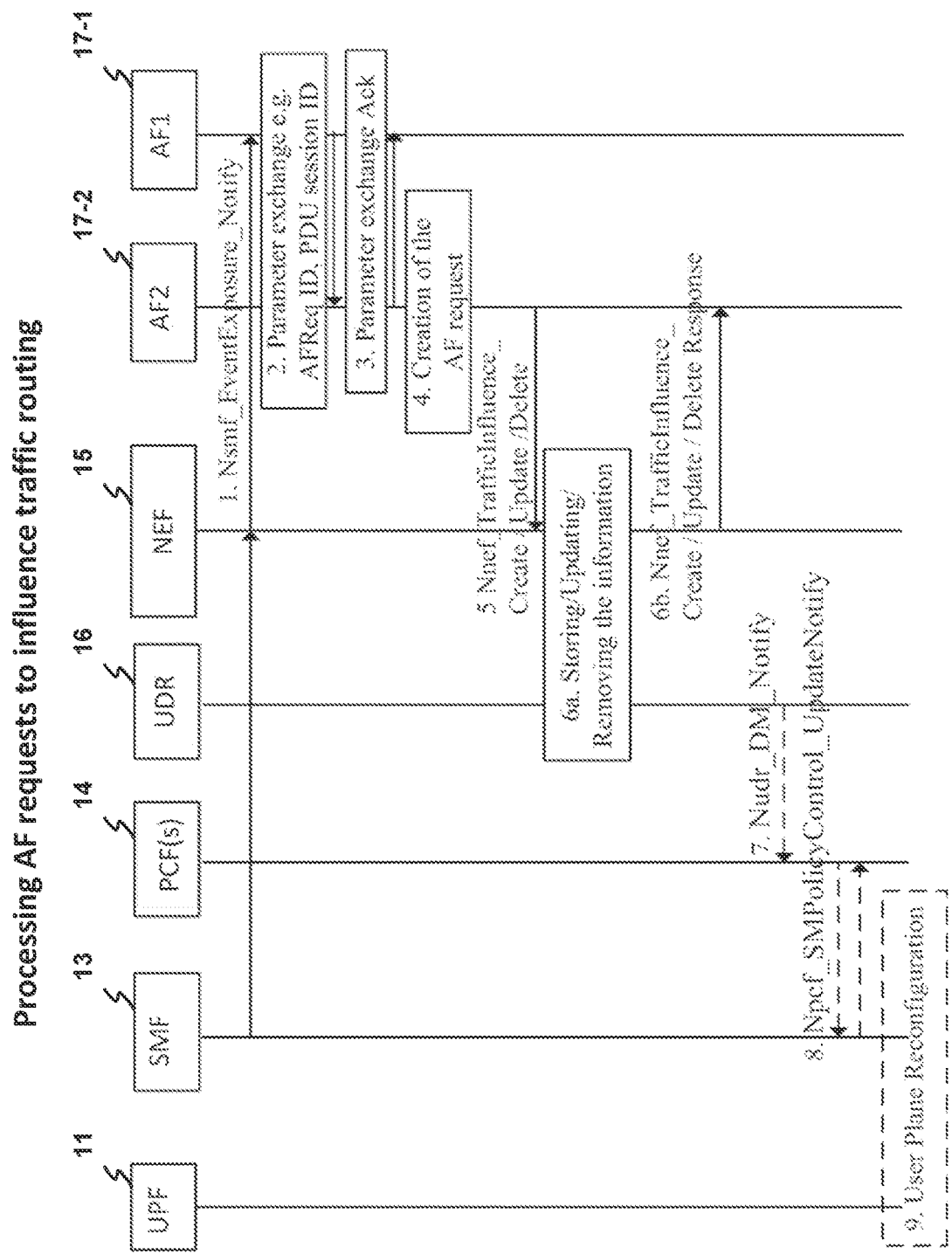
FIG. 8 is a schematic signaling (timing) diagram illustrating an exemplary method for processing AF requests to influence traffic routing in the system shown in FIG. 1.

The proposed method may also include procedures related to multiple Application Function Requests to influence traffic routing. An example of these procedures is shown in FIG. 8, in which:

1. The SMF 13 either directly or via the NEF 15 sends an Nsmf_EventExposure_Notify message to the AF1 17-1. This message is sent after the SMF 13 learns about a DNN change e.g. due to UE mobility, AF request to influence traffic policies, offloading to a LADN, configuration policies and so on. Additionally, DNN change results in re-locating an associated Application Function 17, e.g. re-locating AF1 to AF2 as shown in FIG. 7.
   a. This message corresponds to AF1 request ID and ongoing session ID. It additionally includes a new AF ID i.e. AF2 identifier in this case.
2. On learning AF2 in the new data network, the AF2 17-2 is informed of AF1 request ID corresponding to particular ongoing session ID. This can be achieved, for example by the AF1 17-1 sending a message to the AF2 17-2 directly.
3. The AF2 17-2 acknowledges receipt of the message sent by the AF1 17-1 in step 2 above.
4. The AF2 17-2 creates a new AF request to influence traffic routing, and indicates that this corresponds to the particular session ID and overriding policies corresponding to AF1 Request ID (received in step 2 above).
5. The AF2 17-2 sends the message directly to PCF or SMF or to NEF for example it sends Nnef_TrafficInfluence_Create or Nnef_TrafficInfluence_Update or Nnef_TrafficInfluence_Delete, including information, among others, those mentioned in step 4.
6. The NEF stores the AF requested information in the UDR and replies back to the AF2 17-2.
7-9. Steps 7 to 9 are based on steps 4, 5, and 6 in FIG. 4.3.6.2-1 of 3GPP TS 23.502.

SUMMARY

Beneficially, the above described exemplary embodiments include, although they are not limited to, one or more of the following functionalities:

1) System and method of relocating source-AF (i.e. AF1 in FIG. 5 and FIG. 7) and target-AF (i.e. AF2 in FIG. 5 and FIG. 7) e.g. due to UE mobility in URLLC scenarios and/or change of data network to a LADN or edge network.
2) New message exchanges between the SMF and/or PCF/NEF and target-AF e.g. to exchange AF request ID (specific to earlier or source-AF) and ongoing PDU session ID, e.g. for which session continuity is required.
3) New message exchanges, parameters and procedures between a source-AF and a target-AF, either directly or indirectly e.g. via another entity capable of communicating with them and belongs to 3rd party:
   a. New messages to include information to identify source AF request, temporal validity condition, identify ongoing PDU session, routing and other pre-configured policies on these data networks, and so on.
4) New message exchanges between the SMF and/or PCF/NEF and the source-AF (AF1) e.g. to:
   a. cancel event exposure request earlier subscribed by the source-AF, including for user plane event notification message request from the SMF/NEF; and/or
   b. inform the source-AF about target-AF details such as a DNN it belongs to and/or target-AF identification.
5) Method to update "validity timer" corresponding to AF registered event notification, whereas the method comprises at least one of:
   a. the SMF determining to change to a new/target-AF; and
   b. the SMF receiving an AF request from a target-AF.

The above embodiments describe a number of exemplary methods which can be summarised as:

The SMF determining to change DNN for an ongoing session e.g due to UE mobility or based on received information from AF, resulting in a change of Application Function.

The SMF sending a notification to the target-AF e.g indicating PSA change, change of AF, traffic routing information, etc. The notification may be a late notification.

The SMF and/or NEF cancelling registered event notification request to a source-AF.

Message from SMF and/or NEF and/or Source-AF or other Target-AF indicating ongoing session ID, source-AF request ID, etc.

The SMF updating the timer value corresponding to a Temporal validity condition from the target-AF and deleting the timer value corresponding to Temporal validity condition received from the source-AF.

Benefits

The above described exemplary embodiments provide solutions to address (or alleviate) at least some of the problems identified above.

Among others, proposed solution provides missing part in 3GPP specifications corresponding to Release-15, and it adds novel functionalities and methods to 5G network components including SMF, UPF, NEF and Application Function (AF).

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

The messages used in the above exemplary embodiments are based on 3GPP TS23.502 (e.g. Nsmf_EventExposure_Notify, Nsmf_EventExposure_Subscribe, Nsmf_EventExposure_UnSubscribe, etc.). However, it will be appreciated that other suitable messages may be used, if appropriate.

In the above description, the UE, the (R)AN node, and the core network node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (TO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The above embodiments are also applicable to 'non-mobile' or generally stationary user equipment.

The notification may include at least one of an AF request ID and a PDU session ID. The notification may comprise an 'Nsmf_EventExposure_Notify' message (e.g. a 'late notification').

The method performed by a Session Management Function (SMF) may further comprise cancelling or modifying an earlier AF event notification request associated with the AF.

The cancelling or modification may comprise sending an 'Nsmf_EventExposure_UnSubscribe' or Nsmf_EventExposure_Subscribe message to the AF.

In one example, each notification of a user plane management event is sent when there has been a change of a Protocol Data Unit (PDU) session anchor (PSA) from a first PSA (PSA-1) of first User Plane Function (UPF) to a second PSA (PSA-2) of a second UPF.

The notification of a user plane management event may be sent to the target AF after addition, relocation, or removal of a UPF. The AF may be a target AF for the PDU session.

Various other modifications will be apparent to those skilled in the art and will not be described in further detail here.

LIST OF ABBREVIATIONS

3GPP 3rd Generation Partnership Project
AF Application Function
AMF Access and Mobility Management Function
API Application Programming Interfaces
DNAI Data Network Access Identifier
EPS Evolved Packet System
ETSUN Enhancing Topology of SMF and UPF in 5G Networks
GPRS General Packet Radio Services
GTP-C GPRS Tunneling Protocol
HOL Head of Line
HTTPS Hyper Text Transfer Protocol Secure
LADN Local Area Data Network
NEF Network Exposure Function
NF Network Function
NRF Network Repository Function
PCF Policy Control Function
PDU Protocol Data Unit
PSA PDU Session Anchor
QoS Quality-of-Service
QUIC Quick UDP Internet Connections
REST Representational State Transfer
SDL Shared Data Layer
SLA Service level agreement
SMF Session Management Function
TCP Transport Control Protocol
TLS Transport Layer Security
TTI Transmission Time Interval
UDR Unified Data Repository
UP User Plane
UPF User Plane Function
URLLC Ultra-Reliable Low-Latency Communication

LIST OF REFERENCES

[1] 3GPP System Architecture for 5G System, TS 23.501, 06/2018
[2] 3GPP System Architecture for 5G System, TS 23.502, 06/2018
[3] 3GPP System Architecture for 5G System, TS 23.503, 06/2018
[4] NGMN Alliance, Working Document, Service—based Architecture in 5G, v0.3.12, 12/2017

[5] 3GPP TS 29.274 Tunneling Protocol for Control Plane (GTPv2-C) v15.3.0, 03/2018

What is claimed is:

1. A method performed by a Session Management Function (SMF) in a communication network in which a data network is associated with an application function (AF) which is deployed in an independent node different from a node in which the SMF is deployed, the method comprising:
   in a case where there is an early notification, sending a first event notification request to the AF;
   in a case where there is a change of data network access identifier (DNAI), sending a second event notification of a user plane management event to the AF; and
   in a case where a target data network is associated with a target AF, sending a third event notification of a user plane management event to the target AF, and cancelling the first event notification request associated with the AF.

2. The method according to claim 1, wherein the first event notification includes at least one of an AF request ID and a PDU session ID.

3. The method according to claim 1, wherein the second event notification comprises an 'Nsmf_EventExposure_Notify' message.

4. The method according to claim 1, wherein said cancelling comprises sending an 'Nsmf_EventExposure_UnSubscribe' message to the AF.

5. The method according to claim 1, wherein the second event notification is sent when there has been a change of a Protocol Data Unit (PDU) session anchor (PSA) from a first PSA (PSA-1) of first User Plane Function (UPF) to a second PSA (PSA-2) of a second UPF.

6. The method according to claim 1, wherein the third event notification is sent to the target AF after addition, relocation, or removal of a UPF.

7. A Session Management Function (SMF) in a communication network in which a data network is associated with an application function (AF) which is deployed in an independent node different from a node in which the SMF is deployed, the SMF comprising:
   a transceiver configured to:
   send, in a case where there is an early notification, a first event notification request to the AF;
   send, in a case where there is a change of data network access identifier (DNAI), a second notification of a user plane management event to the AF; and
   send, in a case where a target data network is associated with a target AF, a third notification of a user plane management event to the target AF;
   a controller configured to cancel the first event notification request associated with the AF.

* * * * *